(12) United States Patent
Adler et al.

(10) Patent No.: US 6,239,791 B1
(45) Date of Patent: May 29, 2001

(54) TOUCH SENSOR DISPLAY

(75) Inventors: Glenn J. Adler, Eindhoven (NL); Frans Leenhouts, Overpelt (BE)

(73) Assignee: Flat Panel Display Co., Eindhoven (NL)

( * ) Notice: Subject to any disclaimer, the term of this patent is extended or adjusted under 35 U.S.C. 154(b) by 0 days.

(21) Appl. No.: 09/288,403

(22) Filed: Apr. 8, 1999

(30) Foreign Application Priority Data

Apr. 9, 1998 (EP) .................................................. 98201140

(51) Int. Cl.$^7$ ...................................................... G09G 5/00
(52) U.S. Cl. ........................ 345/178; 178/18.01; 178/18.1
(58) Field of Search .................................. 345/173, 174, 345/178; 350/331, 351; 340/707; 349/162; 178/18.1, 18.01, 18.02

(56) References Cited

U.S. PATENT DOCUMENTS

| 4,553,820 | * | 11/1985 | Harada | 350/331 |
| 4,911,536 | * | 3/1990 | Ditzik | 350/351 |
| 5,194,862 | | 3/1993 | Edwards | 341/20 |
| 5,852,487 | * | 12/1998 | Fujimori et al. | 349/162 |
| 5,867,151 | * | 2/1999 | Nakai | 345/173 |
| 6,028,595 | * | 2/2000 | Shiga | 345/173 |

FOREIGN PATENT DOCUMENTS 3233301    3/1984   (DE) .............................. G01D/13/00

* cited by examiner

Primary Examiner—Bipin Shalwala
Assistant Examiner—Nitin Patel
(74) Attorney, Agent, or Firm—Aaron Waxler

(57) ABSTRACT

In a touch panel display, the touch panel (10) is inclined with respect to the (reflective) display (20) to prevent degradation of the image by spurious reflections.

7 Claims, 1 Drawing Sheet

TOUCH SENSOR DISPLAY

The invention relates to a device comprising a sensor device with a detection device for determining information of at least a part of a surface of the sensor device, a display device comprising an electro-optical medium between two substrates, and a driver for driving the display device in dependence upon the information obtained via the detection device.

Devices of this type (also referred to as touch panels) are generally known, in which different sensor mechanisms can be used. For determining information, it is possible to activate a part of the surface by scanning and measuring, for example activating via light (by means of, for example, a light pen) and by subsequently measuring induced currents or capacitively measuring electric voltages induced by pressure variation. The displayed information may vary from the co-ordinates of the part of the surface to the luminescence of the relevant part or possibly a menu activated thereby in computer applications.

BACKGROUND OF THE INVENTION

A device of this type mentioned in the opening paragraph is described in U.S. Pat. No. 5,194,862. For the sensor device (realized on a panel) described in this patent, it is indicated how it can be used as an overlay for a liquid crystal display device (LCD).

When this type of device is used, notably in portable applications (mini-notebook computers, personal digital assistance devices, telecommunication), it is desirable that a minimal quantity of energy is used.

A further problem is that reflection occurs on reflective faces of the panel. This is at the expense of contrast and color purity.

It is, inter alia, an object of the present invention to provide a device of the type described in which one or more of the above-mentioned problems are largely prevented.

To this end, a device according to the invention is characterized in that the sensor device comprises at least one substrate, a main face of which extends at an angle a with respect to a main face of a substrate of the display device, in which $0<\alpha<15$ degrees.

By placing the substrate of the sensor device at an angle, incident light is reflected through such an angle that it usually does not reach the eye of an observer. The loss of contrast and color purity is thereby largely prevented. This is already achieved at an angle $\alpha<5$ degrees.

Usually, the substrates of the sensor device are parallel. The substrate remote from the display device is preferably placed at an angle a because the reflections on this surface are most disturbing.

A preferred embodiment of a device according to the invention is preferable characterized in that a substrate of a display device remote from the sensor device is provided with a reflector. The use of the reflector provides the possibility of refraining from a backlight, which has an energy-saving effect.

The reflector may be provided on the inner side or the outer side of the substrate of the display device.

In a further embodiment, the substrate of the display device remote from the optical guide comprises a silicon substrate in which, for example drive switches are realized (active addressing) or which incorporates further drive functions.

These and other aspects of the invention are apparent from and will be elucidated with reference to the embodiments described hereinafter.

BRIEF DESCRIPTION OF THE DRAWINGS

In the drawing.

The Figures are diagrammatic and not drawn to scale. Corresponding components are generally denoted by the same reference numerals.

DETAILED DESCRIPTION OF THE PREFERRED EMBODIMENTS

Figure 1:
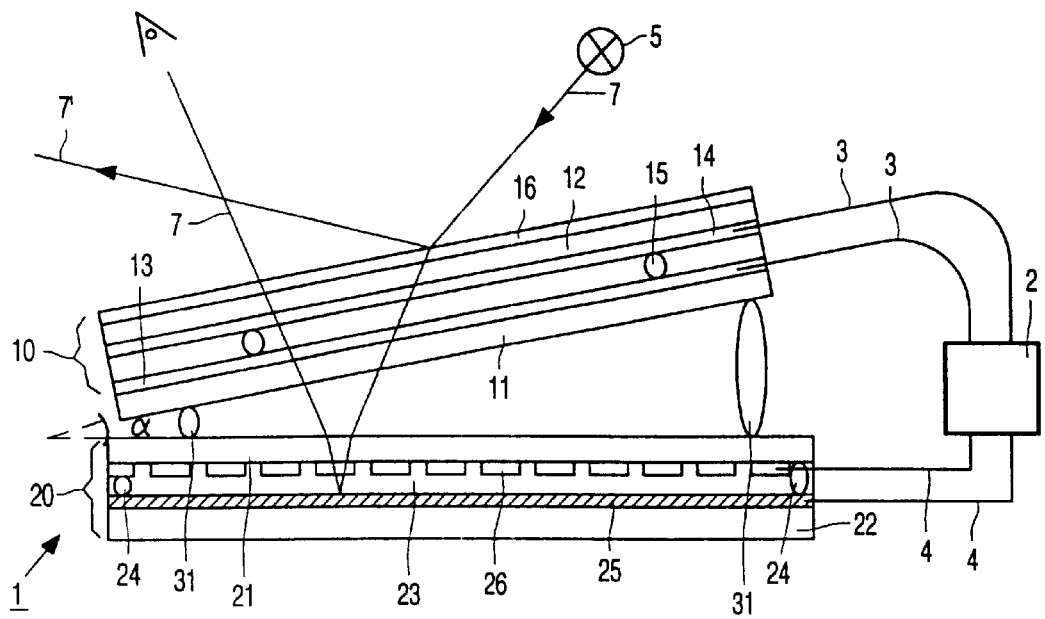
FIG. 1 is a cross-section of a device according to the invention.
Figure 2:
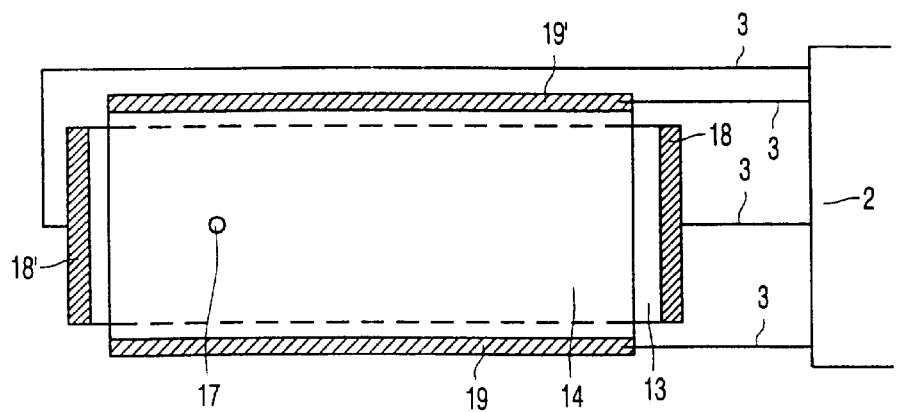
FIG. 2 is a plan view of the sensor device.

FIG. 1 shows a device 1 (touch panel display) with a sensor device in this example a pressure-sensitive device having a first transparent substrate 11 and a second transparent substrate 12. Transparent conducting layers, for example ITO layers 13, 14 which are contacted via metallization strips 18, 19 (FIG. 2), are provided on the substantially parallel substrates 1 1, 12. In this example, the assembly is provided with a protective coating 16, while the substrates are spaced apart by means of spacers 15. If the surface of the sensor device 10 is touched with a pen, for example, at the position 17, while the connection metallizations 19, 19' are, for example, connected to earth via connection lines 3, the resistance between the connection metallizations 18, 18' changes. This change of resistance, which is measured also via connection lines 3, is an indication of, for example the X co-ordinate of position 17 which is stored in detection device 2. Similarly, the Y co-ordinate is determined and stored. If necessary, these X and Y co-ordinates are processed and determine drive signals which are applied to the display device 20 via connection lines 4. In this embodiment, the display device 20 is a reflective liquid crystal display device (LCD) comprising twisted nematic liquid crystal material 23 which is present between two substrates 21, 22 of, for example glass, provided with reflecting electrodes 25 of, for example aluminum, and light-transmissive ITO electrodes 26. The assembly is sealed by means of a sealing edge 24. The display device further comprises polarizers and orientation layers (not shown) which orient the liquid crystal material on the inner walls of the substrates.

Information about the position 17 (the position where the sensor device was activated) is processed in the detection device (which also functions as a processing unit) to an image to be displayed (a luminescing pixel, a functional icon or a computer menu). Instead of the mechanism described above, the detection device may also be based on a matrix of light-sensitive elements which are activated by means of a light pen as used in, for example the device described in said U.S. Pat. No. 5,194,862.

A light ray 7 from a lamp 5 is partly reflected on the surface of the sensor device and partly refracted towards the display device 20. By placing, according to the invention, the main surface of the substrate 11 at an angle $\alpha$ with respect to a main surface of the substrate 21 of the display device, reflected light rays 7' substantially do not reach the viewer 6, so that contrast and color purity are maintained. To prevent parallax, $\alpha$ is chosen to be <15 degrees and preferably of the order of 2 to 3 degrees.

The angle $\alpha$ is realized, for example, by means of spacers 31 of unequal thickness.

Although reflecting electrodes 25 have been shown, they may be alternatively transmissive when a reflector is situated on the other side of the substrate 22.

Instead of an LCD display device, other (reflective) display devices may be used alternatively, e.g. field emission display devices.

Transmissive or transflective display devices are alternatively possible.

A silicon substrate 22 in which, for example drive electronics is realized by means of IC technology, may also be used.

What is claimed is:

1. A device comprising a sensor device with a detection device for determining information of at least a part of a surface of the sensor device, a display device comprising an electro-optical medium between two substantially parallel substrates, and a driver for driving the display device in dependence upon the information obtained via the detection device, characterized in that the sensor device comprises at least one substrate, a main face of which extends at an angle $\alpha$ with respect to a main face of a substrate of the display device, in which $0<\alpha<15$ degrees.

2. A device as claimed in claim 1, characterized in that $\alpha<5$ degrees.

3. A device as claimed in claim 1, characterized in that the substrate of the sensor device remote from the display device is placed at the angle $\alpha$.

4. A device as claimed in claim 1 wherein one of said substrates of the display device is more remote from the sensor device and is provided with a reflector.

5. A device as claimed in claim 4, characterized in that at least one picture electrode on the substrate of the display device remote from the sensor device is reflective.

6. A device as claimed in claim 4, characterized in that the reflector is arranged on the side, facing the electro-optical medium, of the substrate of the display device remote from the sensor device.

7. A device as claimed in claim 6, characterized in that the substrate of the display device remote from the sensor device comprise s a silicon substrate.

* * * * *